Aug. 17, 1965  L. MEYERHOFF  3,201,067
DUCTED FAN AIRCRAFT
Filed May 31, 1963  2 Sheets-Sheet 1

INVENTOR
LEONARD MEYERHOFF
BY *Kenyon & Kenyon*
ATTORNEYS

Aug. 17, 1965  L. MEYERHOFF  3,201,067
DUCTED FAN AIRCRAFT
Filed May 31, 1963  2 Sheets-Sheet 2
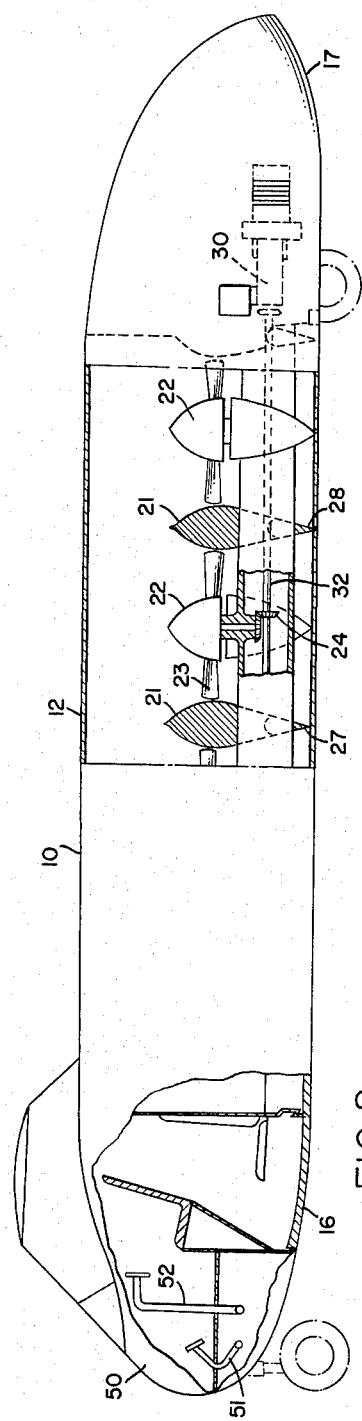
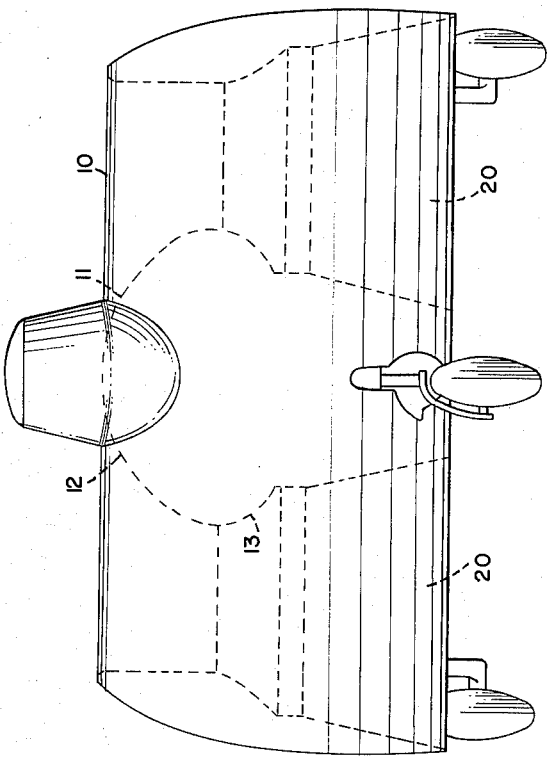
INVENTOR
LEONARD MEYERHOFF
BY *Kenyon & Kenyon*
ATTORNEYS

United States Patent Office 3,201,067
Patented Aug. 17, 1965

3,201,067
DUCTED FAN AIRCRAFT
Leonard Meyerhoff, Brooklyn, N.Y., assignor to
Eastern Research Group, a partnership
Filed May 31, 1963, Ser. No. 284,713
1 Claim. (Cl. 244—23)

This invention relates to aircraft, and more particularly relates to ducted fan aircraft having vertical take-off capabilities. This application is a continuation-in-part of pending application Serial No. 100,849 entitled Ducted Fan Aircraft filed April 5, 1961, now abandoned.

Aircraft having vertical take-off capabilities, and particularly those taking off in the attitude of normal flight have many recognized advantages over aircraft requiring a runway.

There are several approaches to attainment of a vertical take-off vehicle. Among these are the helicopter, the rocket craft, the vertical take-off screw propeller craft, and the ducted fan craft. This last approach is the approach of the present invention.

It is a principal object of the invention to provide a ducted fan aircraft capable of a full range of flight operation including vertical take-off, and whose controls comprise a coordinated system of fan power distribution and controlled fan output manipulation.

Another object of the invention is to provide a multi-ducted aircraft each of whose ducts delivers a relatively high volume low velocity mass of air downwardly to avoid ground-effect dust clouds which may damage the craft or its operating mechanisms.

Another object of the invention is to provide a ducted fan aircraft having unusual lift characteristics due to utilization of the downward intake flow of ducted air over lifting surfaces.

Another object of the invention is to provide a multi-ducted fan aircraft capable of controlled horizontal flight at a variety of speeds with the craft in a level attitude with controlled power distribution and vane orientation.

Another object of the invention is to provide a multi-ducted fan aircraft each of whose ducts has a controllable exit area whereby the volume of flow through the fans can be controlled to improve the efficiency of the ducts.

Other objects and advantages of the invention will become more clear as the description proceeds.

In the drawings, wherein like reference characters identify like parts in all views:

FIGURE 2 is a sectional elevation view taken along line 2—2 of the aircraft of FIGURE 1.

FIGURE 3 is a front view of the aircraft of FIGURE 1.

Figure 1:
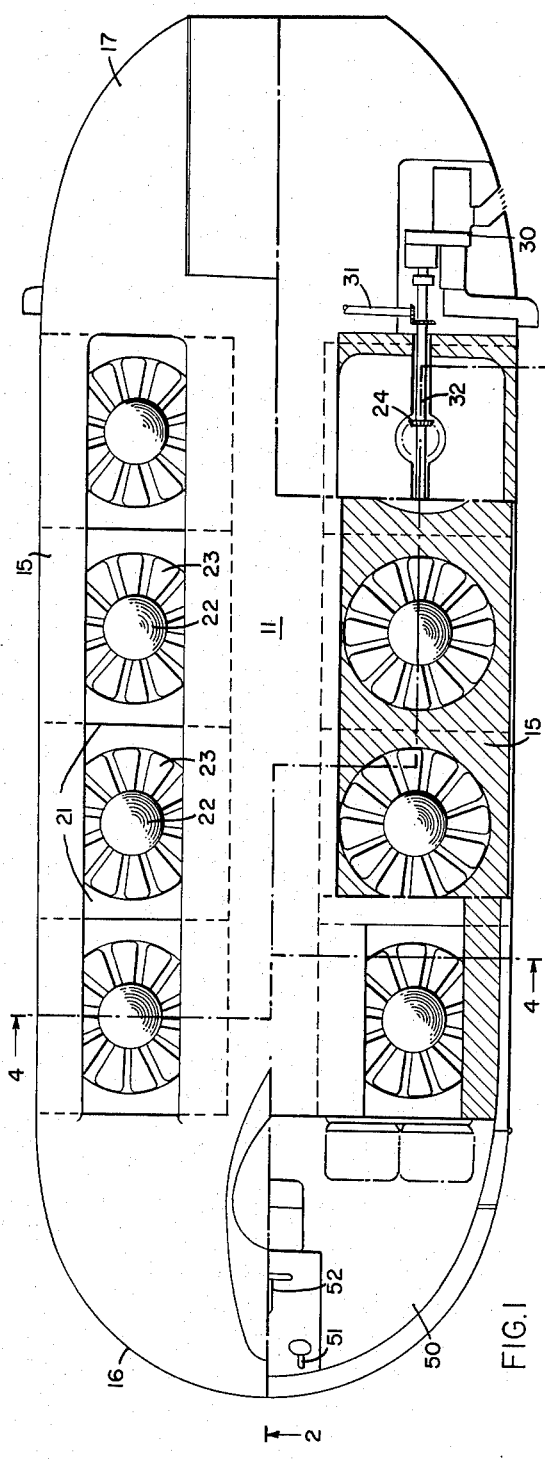
FIGURE 1 is a plan view of an aircraft according to the principles of the present invention.

Referring now to the drawings, the fuselage 10 comprises a central longitudinal portion 11 having a dome shaped outline 12 which is necked inwardly at the sides 13 thereof and thereupon tapers downwardly to bottom 14. This domed configuration is adapted to act as a lifting surface when air passes backwardly over it and vertically downward over it lowering the pressure on the upper surface of the fuselage and thus contributing to lift.

Figure 4:
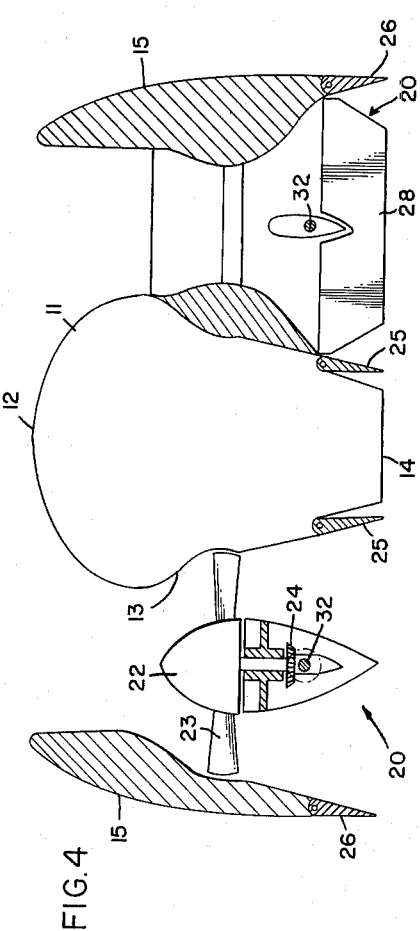
FIGURE 4 is a section view of the aircraft of FIGURE 1 taken along line 4—4.

Central longitudinal portion 11 is surrounded by a peripheral body portion 15 as best seen in sectional view in FIGURE 4 of the drawings. This peripheral portion 15 communicates with central portion 11 at the fore and aft portions of the craft, as at leading edge 16 and at trailing edge 17. The peripheral portion 15 is spaced laterally from central longitudinal portion 11. Leading edge 16 and trailing edge 17 cooperate with the upper domed surface 12 of central longitudinal portion 11 to define an airfoil in the horizontal plane.

A plurality of vertically disposed ducts 20 are arranged fore to aft along the space defined by each outboard side of central portion 11 and each inboard side of peripheral portion 15 spaced laterally therefrom. Thus the inboard side of each duct 20 is defined by and comprises the lateral wall of central portion 11 and the outboard side of each duct 20 is defined by and comprises the inboard lateral wall of the adjacent peripheral portion 15. This arrangement causes air sucked down through each duct to pass over domed portion 12 and to thus create lift thereon independent of and in addition to the reaction lift caused by the fans themselves as hereinafter described.

The remaining walls of each duct 20 are defined by webs 21 that are spaced along the fuselage 10 fore to aft so as to connect the central portion 11 and the peripheral portions 15 into a series of compartments defining the said ducts. A nacelle 22 is disposed in each duct and has aerodynamic lines. Mounted on each nacelle 22 is a fixed pitch fan 23. The pitch and number of blades of the fan 23 is adapted to cooperate with the constructed outline of the duct 20 so as to force a relatively high volume, relatively low velocity mass of air downwardly therethrough when power is applied to the fan. The use of low velocity high volume ducted fans avoids the deleterious effects on the craft and its mechanical parts associated with the usual ducted fan aircraft and caused by dust clouds raised by high velocity air stirring the ground when the craft is within its "ground effect" altitude.

An important feature of the invention resides in the employment of a plurality of ducts 20. In the embodiment shown there are eight, but a greater or lesser number could be employed. On the lesser side, a minimum would be two, one on each side, since the lift of surface 12 as aforesaid depends on a uniform vertical airstream being sucked down from both sides of central portion 11. Above this minimum number, the advantage lies in maneuverability of the craft, as described hereinafter, and in further minimization of "ground effect" dust by making possible a very high volume air blast at relatively low velocity. It will be appreciated that these ducts may be disposed fore and aft rather than along the sides of the craft to accomplish these same objectives.

In the embodiment shown, it is contemplated to employ two engines 30, one to power each row of ducts. The engines are, of course, replaceable by a single power plant. Any shaft engine having satisfactory flight characteristics may be employed. The embodiment shown uses two Allison T63 Turbo-Shaft engines, each of which is capable of developing 250 S.H.P. at 6000 r.p.m. These engines are capable of driving the eight fans, each being twelve bladed and three and one half feet in diameter, so as to force a high volume of air through ducts 20 at a low velocity in the range of 50 to 150 feet per second. These specifications are, of course, illustrative as is the embodiment itself.

Each engine 30 is geared to the other engine by a shaft arrangement 31 and a normally disengaged clutch arrangement (not shown) that may be automatically engaged so as to drive both banks of fans at reduced power from a single engine should the other cut out. The clutch may also be manually engageable. A common shaft 32 for all fans on one side of the craft is powered by the engine 30 on that side. Each fan is driven from shaft 32 by a right angle gear drive 24 which may be replaced by a fluid coupling or other known coupling means. Thus each bank of fans on either side of the craft is powered at a uniform speed. However, the respective banks of port and starboard fans may be powered at varying speeds to assist in certain maneuvers. It is also contemplated to arrange the individual nacelles 22 so that each fan 23 may be powered at an individually selectable speed. This has important maneuverability advantages. A highly advantageous manner of attaining this latter end is to employ a pump (not shown) with each engine 30, and to distribute the hydraulic fluid to individual turbines (not shown) associated with each fan 23 in each nacelle 22. Each fan would then be driven at speed selectable by torque conversion techniques known to those skilled in the art.

A pilot cabin 50 is shown at the fore end of the craft, in the leading edge 16 section. Herein are situated controls, shown schematically at 51 and 52, for maneuvering the craft. It is contemplated that the craft will be capable of a full range of flight maneuvers, by means of coordination of flight parameters forming an important feature of the present invention. These controls will now be described.

Associated with each duct 20 are four vanes 25, 26, 27 and 28. Vane 25 is in all cases inboard of the duct, and pivoted to the central body portion 11. Vane 26 is in all cases outboard of the duct, and pivoted to the peripheral body portion 15. Vane 27 is in all cases forward of the duct, that is, on the web 21 forming the forward wall of said duct, and pivoted thereto. Vane 28 is in all cases aft of the duct, that is, on the web 21 forming the rearward wall of said duct. It will be recognized that in the bank of ducts, the forward vane of one duct is the rearward of the next duct. The vanes are arranged so as to surround the duct outlets.

The various vanes of the various ducts are movable by well known linkages from the pilot's cabin 50. The speed of each bank of fans, that is the starboard, or port bank, is individually controlled from the pilot's cabin. It is also contemplated that by means of said torque convertors, or otherwise, the speed of each fan may be individually selectable. The system of controls 51 and 52 are disposed to coordinate the fan speeds and the vane angles so that turns, banks, ascents, descents and all other flight maneuvers may be effectuated. A feature of the invention is that the entire craft need not tilt in order to increase forward speed, but rather the vanes and power distribution means are adjusted.

The engines 30 and nacelles 22 and gearing or fluid coupling associated therewith are collectively known as power distribution means. The vanes 25, 26, 27 and 28 are movable in such patterns so as to direct the air flow passing downwardly out of the ducts 20 from the vertical direction into directions having a horizontal component as well as a vertical component.

This latter horizontal component controls the attitude and direction of the craft, thus largely controlling its flight path. An additional control factor arises in the selectable speeds of the fans 23. The various directional non-lift components alluded to depend on fan speed as well as vane orientation. Also differential lift between the banks of fans is another control criteria used in banking the craft. When the individual fans are independently selectable as to speed, functions other than banking are aided. It may be seen that many aspects of attitude control may be varied by aid of separately powerable fans.

Still another control factor is provided by controlling the exit areas of said ducts by closing or opening said areas by means of vanes 25, 26, 27 and 28. Thus, if the lower ends of all of these vanes are moved inwardly the exit area of the duct may be reduced thus decreasing the amount of flow through the duct or vice versa. This control means may be used to control the lift of the duct and thus control the craft at take-off and landing. Further, by controlling the exit areas of the ducts the efficiencies thereof can be controlled. At high forward speeds the exit area may be restricted to obtain more thrust per horsepower input.

It is contemplated therefore, that the vane means 25, 26, 27 and 28 and the power distribution means will be coordinated by controls 51, 52 so as to accomplish flight operation and maneuvers. The manner of coordinating these functions does not form a part of the present invention.

In operation, the craft 10 will take off by application of power evenly to all fans 23. Deleterious "ground effect" dust will be at a minimum. Upon being airborne, forward motion will be effected by increased power and proper orientation of the vanes 25, 26, 27 and 28. The craft will not tilt with its trailing portion 17 higher, since the vanes will supply the nonvertical component necessary for forward flight. Controls 51, 52 will coordinate the said vanes and the said power distribution means so as to accomplish all flight maneuvers. The craft will be capable of operation upon one engine 30, by engaging shaft 31 to the remaining engine by a clutch means (not shown).

It will be understood that the embodiment shown is for purposes of illustration, and the inventive principles are not limited by the details shown, but rather these principles may be practiced by varying the construction within the proper scope of the invention as is well known to those skilled in the art. All such variations are contemplated and claimed.

I claim:

Lift producing means for an aircraft comprising at least two ducts vertically disposed in normal flight and positioned side by side transverse the line of flight, a fixed pitch fan in each of said ducts disposed to cooperate therewith to force a relatively high volume low velocity stream of air downwardly therethrough, a means for powering each of said fans and a dome shaped surface attached to said aircraft and disposed intermediate the upper peripheries of adjacent ducts and within the paths of the streams of air that are forced downwardly through said ducts when the fans are in operation, said aircraft having peripheral body portions, said body portions extending above the plane of fan rotation and enclosing said ducts.

References Cited by the Examiner
UNITED STATES PATENTS

| | | | |
|---|---|---|---|
| 1,780,580 | 11/30 | Davis | 244—23 |
| 3,026,066 | 3/62 | Coates | 244—12 |
| 3,045,951 | 7/62 | Freeland | 244—23 |
| 3,066,891 | 12/62 | Seager | 244—23 |

FERGUS S. MIDDLETON, *Primary Examiner.*

MILTON BUCHLER, RALPH D. BLAKESLEE,
*Examiners.*